Figure 1:
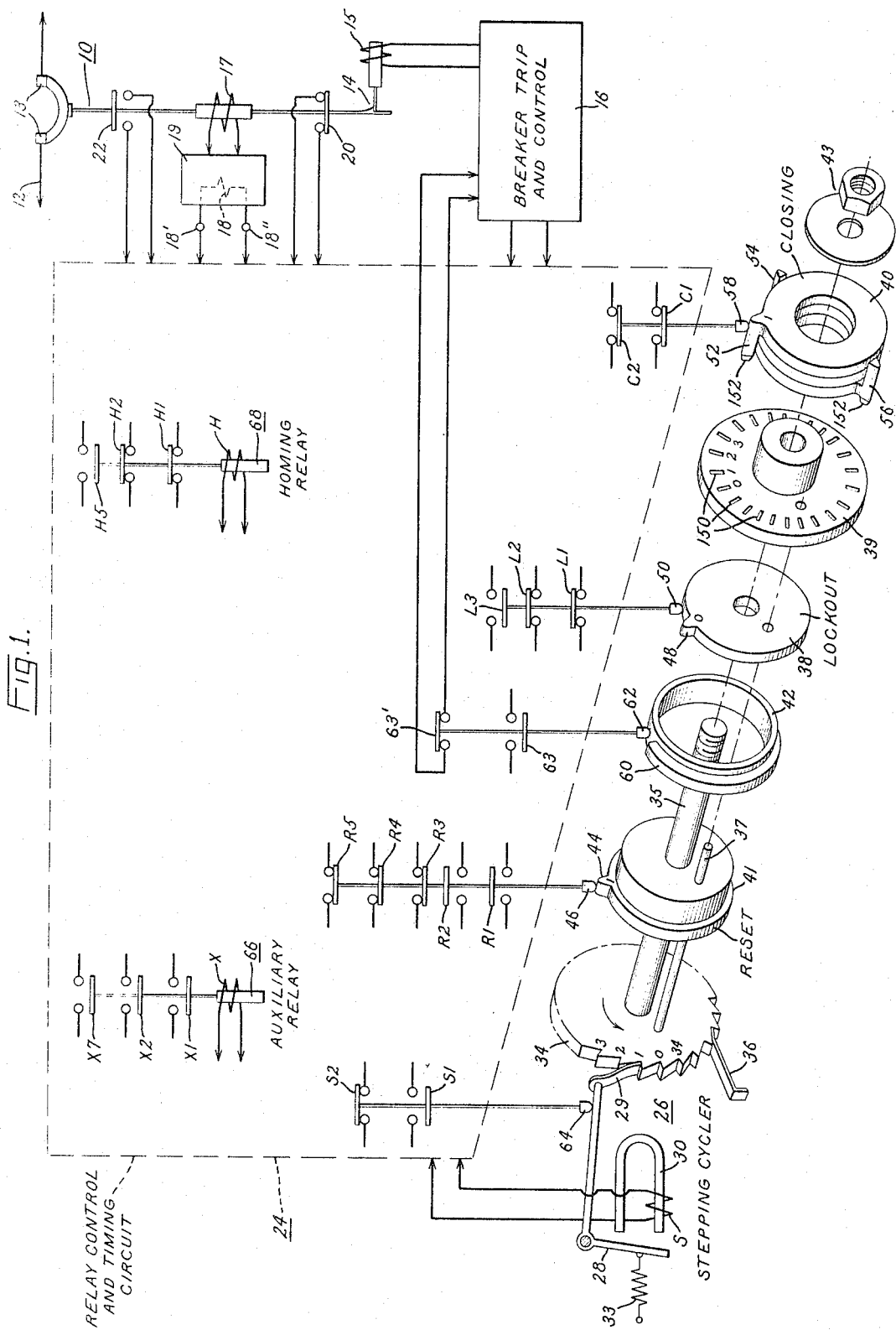

April 30, 1968 W. P. ALLEN 3,381,177
VARIABLE SEQUENTIAL TIME CONTROL RELAY SYSTEM
Filed May 3, 1966 2 Sheets-Sheet 1

United States Patent Office 3,381,177
Patented Apr. 30, 1968

3,381,177
VARIABLE SEQUENTIAL TIME CONTROL
RELAY SYSTEM
Wendell P. Allen, Springfield, Pa., assignor to General
Electric Company, a corporation of New York
Filed May 3, 1966, Ser. No. 547,304
18 Claims. (Cl. 317—22)

This invention relates to relay systems for sequentially controlling a series of operations at various time periods, and particularly to such a relay system for use as a reclosing relay for circuit breakers.

A particular application of this invention is as an automatic reclosing relay for circuit breakers used in power distribution systems, which systems employ protective relays for tripping the breaker upon the occurrence of a fault on the protected line. Such a reclosing relay responds to a signal that accompanies the tripping of the circuit breaker and attempts to reclose the breaker by actuating its reclosing mechanism. Since some faults are of a transient nature, the reclosing relay attempts to reclose the breaker a predetermined number of times if the breaker should be retripped. If the fault lasts for a substantial time, the reclosing relay locks out after performing its control sequence of reclosures, and the attention of an operator is required to clear the fault. However, if the fault is a temporary one, the breaker may remain closed after the operation of the reclosing relay. If so, the reclosing relay should be restored to its normal or reset condition in order to operate again upon the occurrence of another fault on the line.

Under certain conditions (for example, during a thunderstorm) temporary faults may occur repeatedly. For the reclosing relay to be effective in such circumstances, it should be reset rapidly and automatically once the breaker has been reclosed successfully. To meet the varied field conditions under which a reclosing relay operates, the time sequence of reclosing operations of such a relay are preferably variable, reliable and readily adjustable. Under some conditions, a delayed initial reclosure of the breaker is desired; under others, an instantaneous reclosure is required; and under some, reclosure of the breaker should be initiated before it is fully open.

Circuit breaker controls are often equipped with anti-pump mechanisms, so that but a single reclosure is initiated for each reclosing signal from the relay, and repeated tripping and reclosing is avoided. The control mechanism of the reclosing relay should be adapted to operate with such anti-pump mechanisms, and itself prevent breaker pumping under certain conditions.

Accordingly, it is an object of this invention to provide a new and improved relay system for sequentially controlling a series of operations.

Another object is to provide a new and improved reclosing relay system for circuit breakers.

Another object is to provide a new and improved reclosing relay system employing simple and reliable devices.

Another object is to provide a new and improved reclosing relay system in which the timing of the sequential reclosing operations is readily and reliably varied.

Another object is to provide a new and improved reclosing relay system for a circuit breaker which is rapidly and automatically reset upon initiating a successful reclosure of the breaker.

In carrying out this invention in one form thereof for automatically reclosing a circuit breaker, a static timing network is employed to develop a basic time-delay interval. A stepping cycler is stepped generally after each time interval to provide a count of the elapsed time intervals; a cycle of this cycler provides a time base against which a sequence of control operations are referenced.

The stepping cycler rotates a series of cams that individually operate associated sets of switches, including reset, lockout and adjustable closing cams. The reset-cam setting establishes the initial and end points of the time-base cycle; the lockout-cam setting is near the end of the cycle. The adjustable cams are individually settable at any desired step of the stepping cycler for operating the cam switches so as to establish the time sequence of reclosing operations to be performed in response to tripping of the circuit breaker, which sequence may selectively start with an instantaneous or a time-delayed reclosing. An auxiliary relay is provided that is actuated in response to tripping of the breaker, and switches of that relay and the cam switches are connected in various control networks to produce the various control functions that are required, including that of supplying and maintaining the breaker-closing signal for the time-delay interval to ensure anti-pump operation. A homing relay is also provided that is actuated via a control network at certain selective times in the control sequence when the breaker has been successfully reclosed. The switches of this homing relay are connected in various ones of the control networks. Thereby, when actuated, the homing relay initiates the rapid stepping of the stepping cycler through the remainder of its positions, past the lockout position, and back to the reset position. One or more additional adjustable cams are provided for supplementary control functions to be performed at any desired portion of the relay cycle.

Figure 2:
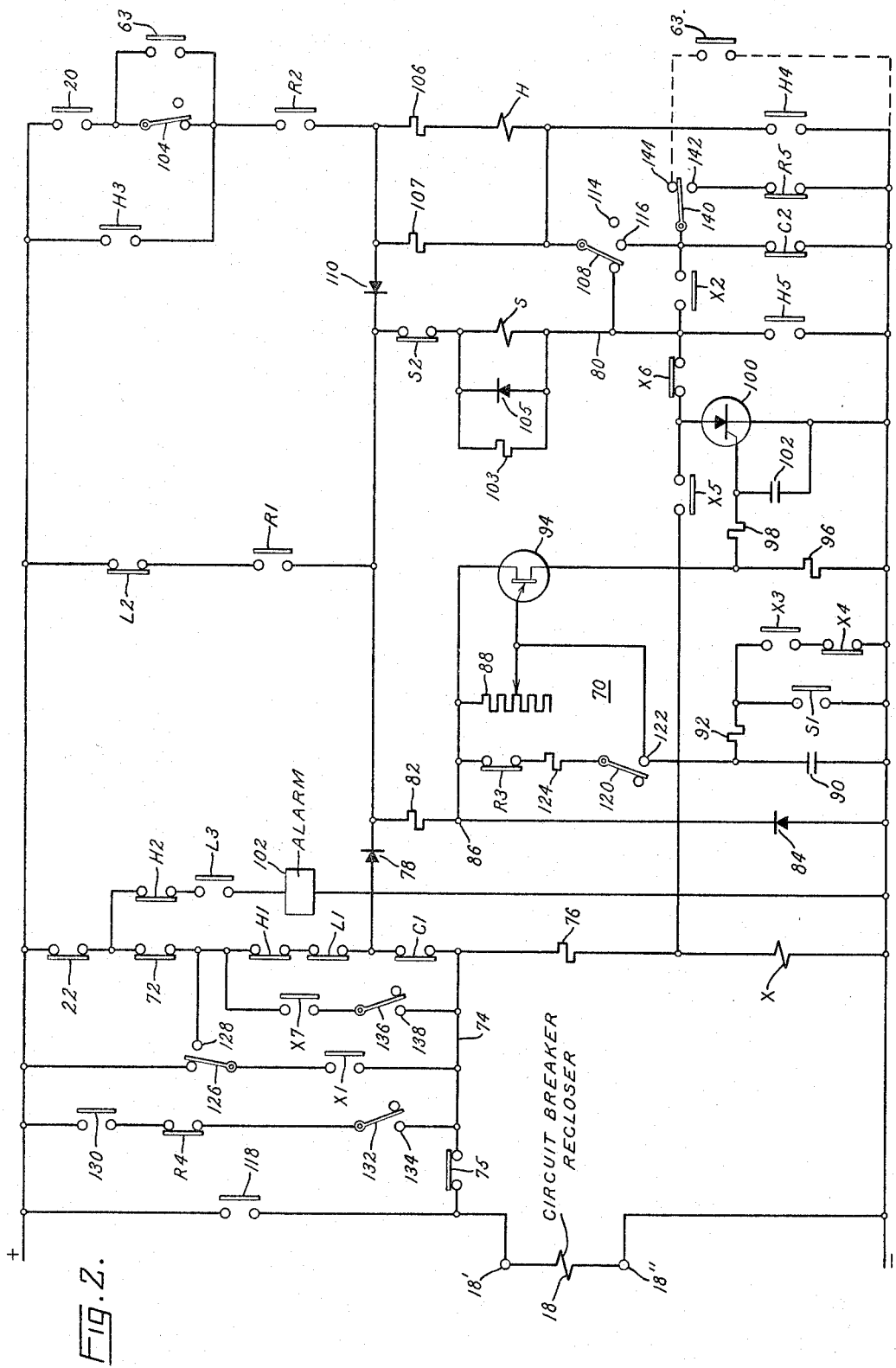

The foregoing and other objects of this invention, the features thereof, as well as the invention itself, may be more fully understood from the following description when read together with the accompanying drawing, in which:

FIG. 1 is a schematic diagram of a circuit breaker reclosing relay system embodying this invention, including an exploded view of a stepping cycler and a fragmentary schematic circuit diagram; and FIG. 2 is a schematic circuit diagram of a relay control circuit for use with the system of FIG. 1.

In the drawing, corresponding parts are referenced throughout by similar numerals.

The relay control system of FIG. 1 is used to control the reclosing operation of a circuit breaker 10 that protects a power line 12, which may be one phase of a polyphase A.C. power system. The circuit breaker 10 is tripped to open the bridging contacts 13 (for example, by a biasing spring, not shown) when it is released by a solenoid operated latch 14, the winding 15 of which is energized by appropriate breaker trip and control circuits 16 that detect various types of faults occurring in the power line 12. These circuits 16 include protective relays and may take various forms, suitable ones of which are well known in the art. The circuit breaker 10 includes a reclosing solenoid 17 (or any other reclosing mechanism, such as a pneumatic operator) which when energized by a relay circuit 19 (represented as a block containing a relay coil 18) restores the circuit breaker contacts 13 to the closed condition. The circuit breaker 10 also includes a movable switch 20, which is closed when the circuit breaker is closed, and a switch 22 which is closed when the circuit breaker is open. The fixed contacts of switches 20 and 22 are connected to a relay control circuit 24 which responds to the conditions of these switches and controls the energization of the relay coil 18 for reclosing the breaker.

A stepping device 26 determines the operating cycle and includes a spring-biased pivoted armature 28 which is actuated by an electromagnet 30 when its coil S is energized to engage its driving spring 29 in the next tooth of a ratchet wheel 34. The armature 28, upon being restored by spring 33 after being actuated, rotates ratchet wheel 34 in the direction of the arrow, which wheel is held against reverse rotation by means of a spring detent 36. Rotating with the ratchet wheel 34 and its shaft 35 (retained in a suitable bearing, not shown) are a reset cam 41 and a lockout cam 38 that are fixed in predetermined rotary positions by means of an index pin 37 that passes through holes therein and in an indicator dial 39. Rotatably mounted on a cylindrical shoulder of the dial 39 is a set of adjustable closing cams 40, and on a shoulder of reset cam 41 is another adjustable cam 42; these cams are frictionally retained in adjusted rotary positions by means of a washer and nut 43 threaded to the end of shaft 35.

In one form of this invention, each step of cycling device 26 corresponds to a 10° rotation of ratchet wheel 34 (which has 35 teeth numbered from #1 to #0, the latter being the 35th tooth) and 36 steps from the #1 position and back thereto which complete a full revolution of cycler 26.

The reset cam 41 has a lobe 44 which actuates a cam follower 46 and associated switches R–1 to R–5 in the "reset" condition of the relay, which corresponds to a #1 position of the ratchet wheel 34. The switches R–1 to R–5 are operated by reset cam 41 and are connected in the control circuit 24 in the manner described below with respect to FIG. 2. The lockout cam 38 has a lobe 48 which actuates a cam follower 50 when the relay is in the lockout condition corresponding to the #0 position of the ratchet wheel 34, and associated switches L–1 to L–3 are actuated by the cam follower 50. The closing cams 40 are annular discs that are individually adjustable (when nut 43 is loosened) to position the projecting and overlapping lobes 52, 54 and 56 of the three cams at any desired set of different rotational positions to actuate a single cam follower 58 and the associated switches C–1 and C–2. The lobes 52, 54, 56 extend axially across the plane of follower 58 so that they are equally effective to actuate the follower. Three cam discs of cam 40 are illustrated in FIG. 1 to provide three reclosing operations corresponding to the lobes 52, 54 and 56; any desired number of such cam discs may be employed as different applications may require.

The first lobe 52 of the closing cam 40 is positioned, by way of illustration, in the #1 position of the ratchet wheel (the reset position) for instantaneous reclosing operation as described below; the other lobes can be independently adjusted to any other appropriate positions for delayed reclosures. The adjustable cam 42 has a lobe 60 that extends over any desired rotational positions and actuates a follower 62 and the associated switch 63; this cam may operate other switches as noted below. Cam 42 is also independently adjustable, and one or more additional cams may be provided as various control functions may require. The stepping-cycler armature 28 actuates a follower 64 and associated switches S–1 and S–2 each time the coil S is energized. The circuit 24 also includes an auxiliary relay 66 and a homing relay 68 and associated coils X and H and associated switches X–1 to X–7 and H–1 to H–5, respectively.

In FIG. 2 the connections in the relay control circuit 24 of the aforementioned switches are set forth in detail, together with a timing circuit 70 that forms a part of the relay circuit. To illustrate the various interrelationships and operations of the circuit, certain switches (such as those associated with the circuit breaker 10) are illustrated in FIG. 2, although they do not form a part of the relay itself as it is ordinarily constructed. The switches shown in FIG. 1 are illustrated schematically in FIG. 2 in various networks corresponding to the associated control operations.

The switch conditions represented in FIG. 2 correspond to those existing with the stepping cycler 26 in the reset or #1 positon (as shown in FIG. 1), and with the circuit breaker 10 tripped open by solenoid latch 14 in response to the detection by circuit 16 of a fault on the power transmission line 12. Under these conditions, the circuit-breaker switch 22 is closed, which supplies a signal that represents the "open" condition of the circuit breaker. This switch has one fixed contact connected to the (+) terminal of a direct voltage power supply of any suitable form, and the other fixed contact connected to a breaker control switch 72 (which is part of the control unit 16 of FIG. 1). A path for energizing the reclosing coil 18 of the circuit breaker includes the two switches 22 and 72, as well as normally closed switch H–1, closed switch L–1, closed switch C–1, the line 74 and another breaker control switch 75 to one terminal of the reclosing-relay coil 18, the other terminal of which is connected to the (−) terminal of the power supply. Thus, for the condition illustrated in FIG. 1 of closing-cam lobe 52 being adjusted to the reset position, the associated switch C–1 is closed, as is the lockout switch L–1, and upon tripping of the circuit breaker and closure of its switch 22 its reclosing coil 18 is immediately reenergized for an instantaneous reclosure of the circuit breaker. At the same time, the aforementioned switches close a path via a resistor 76 to energize the auxiliary relay coil X, which in turn closes switch X–1 that shunts the aforementioned switches to latch in the relay coil X.

A path for immediate stepping of the stepping cycler 26 is also completed via switches 22, 72, H–1, L–1, and a blocking diode 78, switch S–2, stepping-cycler coil S, line 80, auxiliary-relay switch X–2 and closing-cam switch C–2 (which is then closed due to lobe 52 being positioned at the #1 or reset position). Thereupon, the stepping-cycler armature 28 is actuated, and switch S–2 is opened to deenergize the coil S and release the armature 28; the spring 33 then restores the armature 28 to actuate the ratchet wheel and step it to the #2 position.

When the reset cam is rotated from the #1 position, its associated switch R–1 is closed to complete a circuit from the (+) terminal, closed lockout switch L–2, switch R–1, resistor 82, and Zener diode 84 to the (−) terminal. The Zener diode has a uniform breakdown characteristic and functions in a well known manner as a voltage regulator to provide a uniform charging voltage at the junction 86, which is connected to an R–C timing network that includes an adjustable resistor 88 and a capacitor 90, which in turn is returned to the (−) terminal. Since the charging voltage is maintained constant, the time for charging capacitor 90 to a certain voltage varies only with the adjustment of resistor 88. When the stepping coil S was energized, the associated switch S–1 was momentarily closed to provide a discharge path via resistor 92 for the capacitor 90. In addition, a pair of overlapping contacts X–3 and X–4 of the auxiliary relay 66 are connected in series to provide an additional discharge path (shunting S–1) for the capacitor 90 each time the relay coil X is energized or deenergized; these contacts X–3 and X–4 are arranged in a well known manner so that both contacts are closed momentarily (i.e. the closed contact does not open until after the open contact closes) each time the relay coil 66 is energized or deenergized. Thus, upon the first step of the cycler 26 to the #2 position, the discharging path for capacitor 90 is momentarily closed, its charging path is closed, and it starts to charge via the adjustable resistor 88.

The tap of resistor 88 is connected to the emitter of a unijunction transistor 94, one base of which is connected to the regulated-voltage junction 86, and the other base is connected via a load resistor 96 to the (−) terminal, and via a resistor 98 to the control electrode of a silicon controlled rectifier 100. The cathode of rectifier 100 is connected to the (−) terminal, the anode is connected to the junction of auxiliary-relay switches X–5 and X–6. A capacitor 102 is connected from the control electrode of the rectifier 100 to the (−) terminal and provides a bypass for transient signals that might otherwise trigger the rectifier.

In operation, after the first, immediate step of the cycler to the #2 position, the capacitor 90 starts to charge to the triggering threshold for unijunction transistor 94, with the charging rate determined by the adjustment of resistor 88 to provide an appropriate time-base interval. One suitable interval is 5 seconds, and a range of .5 to 5 seconds, by adjustment of resistor 88, has been found suitable for some applications. When the capacitor voltage reaches that threshold (e.g. about 55 percent of the voltage at junction 86), transistor 94 conducts momentarily to partially discharge capacitor 90 and turn itself off, so as to produce a positive-going voltage spike across resistor 96. This voltage spike is impressed on rectifier 100 sufficiently long to turn the latter on, and it draws current via the auxiliary-relay switch X–5 (which is then closed), resistor 76 and switch X–1; the rectifier 100 when conducting heavily provides a bypass for the auxiliary-relay coil X, and the latter is turned off to restore the switch contacts X–5 and X–6 to the condition shown in FIG. 2 (which turns off rectifier 100) and to discharge the capacitor 90 via contacts X–4 and X–3. The rectifier 100, when turned on, remains on until its current is substantially reduced, and when turned off it remains off until the triggering voltage is reapplied to its gate electrode; thus rectifier 100 is turned off when switch X–5 opens. The capacitor 90 immediately starts to recharge (since switches L–2 and R–1 remain closed) and the next time transistor 94 is triggered, its spike again triggers the silicon controlled rectifier 100, which conducts via now closed switch X–6, and energizes cycler coil S via switches S–2, R–1 and L–2. Thereby, the stepping cycler 26 is again actuated and stepped to the #3 position. The resistor 103 across coil S permits rapid build-up of current in rectifier 100, and the diode 105 thereacross provides a fast discharge path for that coil S. The rectifier 100 is turned off by the opening of switch S–2.

If during this interval the circuit breaker 10 again reopens to close switch 22, there is no change in the operation of the overall relay circuit until the second lobe 54 of the closing cam 40 actuates its follower arm 58. Assuming, for example, that this lobe 54 is adjusted to be in the #3 position of the stepping cycler (corresponding to two time-intervals from the reset position or, for example, to a 10-second time delay period), switch C–1 is again closed to complete the energizing path for the auxiliary-relay coil X, which is latched via switch X–1 as described above. Switch X–2 is also closed as is C–2, and the path via these switches, line 80, stepping-cycler coil S, and switch S–2 provides an immediate step of the cycler to the #4 position at the same time that the circuit breaker reclosing coil 18 is energized to reclose the circuit breaker. After the time-delay interval (which corresponds to the immediate step) the timing network 70 operates to trigger rectifier 100, which conducts via switch X–5, as described above, to turn off the auxiliary-relay coil X, but without an additional cycler step. Thereafter, the timing network repeats its operation, and the next firing of rectifier 100 is via switch X–6 to energize the cycler coil S and step the cycler 26 to the next position, and so on, with each step of cycler 26 augmenting the count of the number of time-delay intervals that have occurred since the initial tripping of the circuit breaker 10.

Once started, the operation of the timing network 70 continues to step the cycler 26 to successive positions (unless the fault is cleared and the circuit breaker remains closed) until closing-cam lobe 56 actuates the follower arm 58 to close C–1 again. The latter completes the energization circuit via switch 22 (which is closed when the breaker is open) for the circuit-breaker reclosing coil 18 and for the auxiliary-relay coil X. The cycler is immediately stepped again, the timing network is operated to measure the time interval for the immediate step without taking an additional step, and thereafter it operates to step the cycler successively. If the circuit breaker should reopen after the third reclosure (for this embodiment employing three closing-cam lobes), no further attempts are made at reclosing it. The cycler is successively stepped by the timing network until it reaches the #0 or lockout position; at this point L–1 and L–2 are opened to terminate operation of the timing network 70. The opening of switch L–1 prevents further energization of the circuit-breaker reclosing coil 18 until it is manually operated. In addition, the lockout switch L–3 closes, and together with the normally closed homing-relay switch H–2 and the closed circuit-breaker switch 22, a circuit is completed to energize an alarm 102, which warns the operator that the circuit breaker is open and the relay system has stepped through its sequence of attempted reclosures and failed to maintain the circuit breaker reclosed.

When the fault that initiated the tripping of the circuit breaker is a momentary one, so that upon reclosing the circuit breaker it remains closed, the relay system is arranged to be reset rapidly to the #1 position to be operative immediately should another fault occur. For this purpose the homing relay 68 is used and its coil H is energized via the path from the (+) terminal through the "closed" circuit-breaker switch 20, an adjustable selector link or switch 104, switch R–2 (which is closed after the reset cam is stepped from the reset position), the homing-relay coil H in series with a resistor 106 (if needed), an adjustable selector link or switch 108, switch X–6, and the rectifier 100 to the (−) terminal. During the first timing period (which follows a reclosure and an immediate step) the switch X–6 is open, and it is closed during the second timing period and provides a path energizing the homing-relay coil H at the end of the second time delay. When the rectifier conducts current via the cycler coil S for the second step, current is also drawn through the homing-relay coil H (and its shunt resistor 107) providing that the circuit breaker switch 20 is closed at that time. The homing relay latches in via switch H–3 (connected across switch 20) and via switch H–4 (connected across rectifier 100); at the same time switch H–5 is closed (which shorts out rectifier 100) to complete an energizing path for the cycler coil S, via switch S–2 and closed switches R–1 and L–2. The cycler coil S is repeatedly energized via switch H–5 (and deenergized by the opening of switch S–2) to rapidly step the cycler 26 through the remaining positions until it is home at the #1 or reset position.

The coil S is energized via blocking diode 110 and switches R–2 and H–3, so as to step the cycler past the lockout position, where L–2 is open. At reset, switch R–2 reopens, which terminates the stepping of the cycler and opens the circuit to the homing-relay coil H. The circuit is then restored to the reset condition generally indicated by the relay switch conditions of FIG. 2. During the homing operation, switch H–1 in the reclosing network is opened, which prevents any reclosure taking place during the rapid reset of the relay. However, if a trip should occur during the homing operation, the homing continues unabated, whereby the relay system is rapidly reset within a second or two, and it is in condition to begin a new cycle and reclose the breaker immediately upon entering the reset position. The switch H–2 is also opened during homing, which prevents the alarm 102 from being operated as the homing stepping cycler passes through lockout.

With the rapid-reset link in the position shown in FIG. 2, the homing operation is initiated two time intervals after a successful automatic reclosure of the breaker. During any reclosing operation itself, rectifier 100 is always turned off, and at the end of the first time interval, switch X–6 is opened and the rectifier conducts via X–5; at the end of the second time interval X–6 is closed, so that the homing operation can start if the closing-cam switch C–1 produced a successful reclosure. The two delay intervals before starting the homing operation are sufficient for the reclosure to be successful under certain fault conditions.

If the rapid-reset or homing feature is not desired in a particular application of this relay system, the link 108 may be connected to floating terminal 114, which effectively disconnects the homing relay H from the circuit. Alternatively, the link 108 may be connected to the terminal 116, whereby the energization path for relay coil H is via switch C–2. Under these circumstances, the homing operation is initiated at the "next close" position; that is, at the stepping-cycler positions determined by the closing-cam adjustments of lobes 54 and 56, a test is made to determine whether the breaker is closed or open; if open, switch C–1 together with switch 22 initiates a reclosing operation; if the breaker is closed, switch C–2 together with switch 20 initiates the rapid reset or homing operation by energizing homing relay coil H, which latches in via switch H–4 bypassing C–2 and which closes switch H–5 to actuate the stepping cycler in the manner described above.

An additional control may be provided for the initiation of the rapid reset action by means of the adjustable-cam switch 63 that is closed during a limited time period (e.g. from #7 to #0 position) of the relay cycle by the adjustable cam 42. With the connection of link 108 in the position shown in FIG. 2 and the opening of link 104, the switch 63 is placed in the energization path for the homing-relay coil H; thereby the homing operation can be initiated only when that switch 63 is closed. By an appropriate selection of the position of adjustable cam 42, an independent control is provided for initiating rapid reset. For example, if a time delay after the first instantaneous reclosure of greater than two time intervals is desired, the adjustable cam is adjusted accordingly. Thus, the rapid reset operation can be blocked until the adjustable cam closes switch 63.

In summary, the normal condition of the relay system is the reset or #1 position, at which switches R–1 and R–2 are open, as is switch 22 with the breaker closed. The timing network 70 is not energized, and the relay system is quiescent. When a fault occurs on the line to trip the breaker 10 to the open condition, switch 22 closes and (where closing-cam lobe 52 is set to the #1 position for instantaneous reclosure so that switch C–1 is pre-closed) completes the energizing circuit to reclosing-relay coil 18 and auxiliary-relay coil X, which in turn results in an immediate step of the cycler coil S via switches X–2 and C–2. The stepping of the cams to the #2 position closes switch R–1, which completes and maintains a circuit for energization of the timing network 70; the time relay interval terminates with the conduction of silicon control rectifier 100 via switch X–5, without an additional step of the cycler, so that the latter keeps an accurate count of the time intervals subsequent to the initial opening of the circuit breaker. The triggering of rectifier 100 shorts out the auxiliary-relay coil X, which action in turn discharges the capacitor 90. The next time interval is measured in the same fashion, but with the rectifier 100 conducting via contact X–6 to step the cycler to the succeeding position.

The operation continues until the stepping cycler reaches the position of the next adjustable-cam lobe 54, at which point, if the circuit breaker has again opened, another attempt is made at reclosure in the same fashion with another instantaneous step of the cycler. Thereafter the time-delay interval is measured by circuit 70 without stepping the cycler in the fashion described above, so that the stepping cycler maintains the proper count of the elapsed time intervals. The operation continues again in the manner described, and at the stepping cycler position for cam lobe 56, if the circuit breaker has again been tripped, another reclosure attempt is made. If the circuit breaker continues to be tripped, the cycler is stepped through the remaining positions to complete the lockout of the relay at the #0 position, at which time the lockout-cam switch L–3 is closed, and the alarm 102 is actuated.

If the fault is a momentary one, so that the initial instantaneous reclosure is successful and the circuit breaker remains closed, upon completion of the second time interval (with the link 108 set as illustrated in FIG. 2) the homing-relay coil H is energized via switch 20, reset link 108 and rectifier 100. Thereby switch H–5 is closed and the cycler coil S is repeatedly energized until the stepping cycler is restored to the reset condition. By adjustment of link 108 the homing operation may be made to occur upon the next reclosure attempt determined by the setting of cam lobes 54 and 56; or by opening link 104, the homing operation may be initiated under control of switch 63 of adjustable cam 42 during any desired time interval of the relay cycle. The latter result could also be obtained with an alternative arrangement wherein link 108 is connected to contact 116, link 104 is closed, link 140 is connected to contact 144, switch C–2 is disconnected, and, as shown by broken lines in FIG. 2, switch 63 is connected between contact 144 and negative power. By setting reset link 108 to contact 114, the homing operation may be disabled.

The breaker-control switch 72 is ordinarily part of the breaker control 16, rather than part of the relay system of this invention. Such a switch is customarily used with a manually operated breaker switch control and may take the form of a three-stage switch. Switch 72 is closed when the breaker is manually closed and after manual closure, and it is open when the breaker is manually tripped and after manual tripping. Thus, the breaker may be manually tripped for repair or maintenance work, and switch 72 opens to prevent the accompanying closure of switch 22 from initiating operation of the relay system until the breaker is reclosed manually. Switch 75 is a related breaker switch that is open during the time of manual closure or tripping and closed thereafter.

Once the relay system release reaches the lockout condition, it can be restored to the reset condition only by manual operation of a breaker control switch 118, which is always in the open condition except while manually operated to the closed condition to complete the energization circuit for the reclosing coil 18. Breaker control switch 75 opens while switch 118 is closed to prevent actuation of the auxiliary-relay coil X. While the breaker is closed, the time delay network 70 is energized via switches 20 and R–2 and blocking diode 110. If the breaker remains closed for the full time-delay interval the stepping cycler coil S is energized via switches 20 and R–2, diode 110 and rectifier 100, which steps the cycler to the reset position and terminates the relay cycle. However, if the breaker should again trip after the momentary manual closure, breaker switch 20 opens and the relay system remains in the lockout condition and sounds the alarm. If the homing-control network employs adjustable-cam switch 63 as described above, this switch is closed in the lockout condition (or it can be shunted with an additional lockout-cam switch, not shown, that is closed only in lockout). Thereby, an energization path for the timing network 70 is always available for manual reset from lockout.

The switch 75 may be replaced by an eighth X-relay switch (not shown) which would be normally open and, thereby, prevent energization of the coil X during manual reclosure of switch 118. The operation of the relay system would remain generally similar to that described above, except that the reclosing signal (via switches 22 and C–1) would initially energize the coil X and thereafter, upon closure of its aforementioned eighth switch, the reclosing coil 18 is energized. This modification would result in a delay of breaker reclosure of only about 8 milliseconds.

If a delayed initial reclosure is desired, the cam lobe is adjusted to the position corresponding to the required time delay. Upon tripping of the breaker, the switch 22 is closed which completes an energization path to timing network 70 via switches 72, H–1 and L–1, and diode 78. Due to switch C–1 being open, neither the reclosing coil 18 nor the coil X are energized; and due to X–2 and C–2 being open, the coil S is not energized immediately. The timing network 70 operates through a timing cycle, and thereafter the cycler is stepped to the #2 position; if cam lobe 52 is set for more than one time delay interval, the timing network 70 repeats its operation and steps cycler 26 until cam lobe 52 actuates the follower 58 to close C-1. At that point the circuit is completed to energize reclosing coil 18 and relay coil X, and the operation continues from then on in the manner described above. Thus, for example, a time delay of five seconds for the initial reclosure may be provided by positioning lobe 52 at the #2 position of the stepping switch. Where a time interval for the delayed initial reclosure is desired that is less than that normally provided by time delay circuit 70, a modified time delay interval for the first step is provided by the adjustment of link 120 to contact 122, which connects a resistor 124 and switch R-3 across resistor 88. Switch R-3 is closed only in the reset position of the relay system, which provides a charging path for the capacitor 90 of substantially less resultant resistance (that of parallel resistors 88 and 124) and therefore a smaller time delay for the first step. If a longer time delay is desired for the first step, it will be apparent that a similar arrangement may be employed to connect a second capacitor in parallel with capacitor 90.

The relay system described thus far contemplates the use of a circuit breaker control system which has appropriate relay controls to ensure anti-pump operation upon reclosure; such anti-pump circuits are well known in the art and would be part of block 19 of FIG. 1, and not part of the relay system of this invention. One typical form of anti-pump circuit utilizes two auxiliary relays, the first of which (represented by coil 18) receives the "reclose" signal at terminals 18' and 18'' and energizes the breaker reclosing mechanism 17. When the breaker recloser 17 is operated, a switch (not shown) closes and picks up the second auxiliary relay (not shown) which latches in through the "reclose" signal path represented by terminals 18' and 18''. When operated, this second relay includes a switch that opens up the energization path for coil 18 of the first such relay until the second relay is released by termination of the "reclose" signal at terminals 18' and 18''. Thus, as long as the "reclose" signal is maintained, such an anti-pump circuit 19 prevents a second reclosure of the breaker after retripping.

The auxiliary-relay coil X, latched in by switch X-1, is released by the triggering of rectifier 100 after the timing network 70 operates. Thus, switch X-1 maintains the "reclose" signal at terminals 18' and 18'' for a full time-delay interval after the breaker trips and switch 22 closes. Thus, the relay system ensures proper operation of such an anti-pump circuit 19 and prevents a second "reclose" signal from being generated within the time-delay interval. In addition, the immediate step of the cycler 26 (when the "reclose" signal is developed) prevents pumping of the breaker if the relay control power is lost when the breaker trip signal occurs (e.g. where the control power is rectified A.C. from the protected line) and then returns after the breaker opens. The loss of power terminates the "reclose" signal, but the latter is not reinstated upon return of power, since the immediate step served to rotate the closing cam and open C-1.

Where the circuit breaker does not incorporate such an anti-pump circuit 19, it may be provided by connecting link 126 to contact 128. Thereby, the latching circuit for relay coil X via its switch X-1 is broken immediately upon reclosure of the breaker and the opening of its switch 22. Accordingly, the X relay does not maintain the reclosing signal after the immediate stepping of the stepping switch to the #2 position. As a result, at the end of the first time delay interval, rectifier 100 is triggered via switch X-6 to step the cycler to the #3 position, and a measured time interval corresponding to the initial step is not developed due to the auxiliary-relay coil X being deenergized. For each such immediate step, the corresponding time delay is not developed, and the settings of the adjustable cam with respect to stepping cycler dial 39 would reflect an excessive count of time intervals. Thus, the settings of the adjustable-cam lobes 54 and 56 are chosen with this factor in mind when the anti-pump connection is made. However, anti-pump operation is achieved in that switch X-1 is open if the circuit breaker retrips after reclosure, and the reclosing coil 18 cannot be reenergized immediately nor until the prescribed setting of the next adjustable-cam lobe. Where this anti-pump feature is employed, the #2 step is achieved with only a five second delay following breaker reclosure. Since this may be insufficient time for proper reclosure to be assured, the rapid reset operation of homing relay 68 may best be controlled by the next closing-cam lobe, which is attained by connecting link 108 to contact 116.

In some power distribution systems, a main feeder line is protected by a circuit breaker, and the branch feeder by fuses. This economical means of sectionalizing a system requires that a fault on a branch be cleared initially by tripping the main breaker with a high-speed protective relay (which is part of the breaker control 16). If the fault persists following instantaneous reclosure, it must be cleared the second time by the branch feeder fuse. To accomplish this, the contacts of the high-speed protective relay must be blocked after the initial tripping of the breaker. Thereby, the main breaker tripping is transferred to a time-delay unit, which allows time for the branch fuse to clear. The blocking of the high-speed protective relay is accomplished by using a sixth R-switch (not shown) which is closed by the reset cam when in the reset position. The immediate step of the cycler 26 upon instantaneous reclosure opens this sixth R-switch before the breaker is reclosed. Thereby, instantaneous tripping of the breaker is blocked after the first and subsequent reclosures, and a time-delay is provided for the branch fuse to clear the fault instead of the main breaker. This sixth R-switch is closed with the relay system in the reset condition, so that instantaneous tripping is provided on the first tripping of the breaker as well as instantaneous reclosure. If desired, in place of a sixth R-switch for blocking the instantaneous trip circuit, an additional switch 63' (FIG. 1) actuated by the lobe 60 of the adjustable cam (or by an additional such cam) may be used. This cam would be adjusted to operate the associated switch 63' so as to open the instantaneous trip circuit in the breaker control circuit 16 only after the first reclosure. Thereby, two high-speed tripouts of the main breaker would be provided before shifting to time-delay tripping to clear the branch fuse on the second or later reclosure. Instantaneous tripping can be automatically reinstated at lockout by means of an adjustable cam (such as cam 42) and its switch, with the cam adjusted to close the switch at the lockout position. This switch is connected across the aforementioned sixth R-switch. Thereby, at lockout, when the circuit breaker is manually closed, the trip circuit is instantaneously energized if the fault is still present.

Other control applications of the adjustable cam 42 and its switches (or of additional such cams) will be apparent to those skilled in the art. For example, this cam may be adjusted to close its switch in the reset position, open it shortly after the start of a cycle and reclose it ahead of lockout. Thereby, this switch can be connected in a control circuit to block automatic load-ratio control while the relay system is in that portion of its cycle in which breaker reclosure is performed, and reinstate that control when the relay locks out or resets. Another application of such an adjustable cam and its switch is as a spare alarm switch that may be connected across switch L-3. The cam is adjusted so that its switch closes between the last reclosure and lockout and opens between lockout and reset. Thereby, the alarm would ring as soon as the last reclosure failed, and thus substantially earlier than the lockout position. The lockout cam 38 may also be made adjustable so that the lockout may be achieved immediately after the last unsuccessful reclosure. Thereby, the alarm 102 would be sounded earlier; the extra time in passing from lockout to reset upon manual reclosure may be desirable in some cases, especially where the time-delay interval is a short one.

Under certain fault conditions, a "very fast" reclosure of the breaker is desired which is faster than the "instantaneous" reclosure described above. That is, the reclosing coil is energized under certain fault conditions even before the breaker contact 22 closes. Such a reclosing signal may be provided by protective relay circuitry of an appropriate known type in the breaker trip and control 16. One example of such a fault condition on a power line which calls for a "very fast" reclosure is that of arcing to ground produced by a lightning discharge. A reclosing signal for "very fast" reclosure is provided by the switch 130, which is not part of this relay system, but is part of the aforementioned protective relay circuitry. Switch 130 closes in response to a fault before the breaker is tripped open, and a control network immediately energizes the reclosing coil 18, so that the breaker never actually completely opens, which is the desired mode of operation for such faults.

The control network for operating with the reclosing signal of switch 130 is rendered operative by the connection of link 132 to contact 134, link 136 to contact 138, and link 140 to contact 142; generally the first closing-cam lobe 52 is set for a delayed reclosure. The path for "very fast" reclosure is via switches 130 and R-4, link 132, and contact 134 to reclosing coil 18; this path also energizes the auxiliary relay coil X via line 74 and resistor 76; in addition, an immediate step of cycler 26 is produced via line 74, contact 138, link 136, switches X-7, H-1, L-1, diode 78, S-2, S, X-2, link 140, contact 142, and R-5. Thereafter, the timing network starts to operate, and the relay system goes through its cycle in the manner described above. With this "very fast" reclosure arrangement, each of the closing-cam lobes 52, 54, 56 is used to provide a delayed reclosure. In place of the reset-cam switches R-4 and R-5 for limiting the time during which "very fast" reclosure is enabled, switches of an adjustable cam, such as cam 42, may be employed; these switches would be closed only in the reset position.

The stepping cycler 26, as it is employed in the reclosing relay system, provides a control cycle that starts with the reset position and ends with that position (or with the lockout position) in which the time base is made up of a certain number of substantially equal time steps or increments. The dial 39 provides a ready reference or "time line" that is composed of equal time segments and provides a means for locating the relative positions of the various cams at desired points in the cycle to produce the various control signals that are required. The setting of the reset cam 41 determines the beginning and end of the time cycle, and the setting of the lockout cam 38 determines the end of the cycle if the reclosures are unsuccessful. Reclosing signals are readily specified for any preselected point on the "time line" merely by positioning the adjustable cam lobes 52, 54, 56 adjacent the time scale on dial 39; thereby, the time steps for the sequence of reclosing signals are independently determined and the sequence can start at any desired point including at the reset position for an instantaneous reclosure. These adjustable cams are also used to establish other control signals, such as those used for initiating rapid reset. In addition, cam 42 is also independently adjustable to develop any other desired control signals at any point or points of the time line.

The static condition of the cycler at any step determines the combinatorial relationship of control signals that are developed from the various cam switches. Indentations 150 are provided on the dial face at each step position to receive projections 152 on each of the cam lobes. Thereby, accurate indexing of these cam lobes is achieved, and a physical identification of each step is provided by way of the dial to permit the ready choice of points on the "time line" quickly and accurately for the desired control signals; no measurements are required to check settings of the cams. Similar indexing of the adjustable cam 42 may be provided if desired. By relating the control signals to each step in time when the cycler is stationary, other time-related control operations, such as the rapid reset of the relay system after a successful reclosure, are readily located either a desired time after each such reclosure or at any other point on the "time line" as may be desired. In choosing and setting the time for the various control signals, it is merely necessary to choose the particular point in a fixed cycle at which it is desired that the control signal occur or merely to relate it to a previously established control signal to have it occur at the same time or with some predetermined time relationship to it. This system lends itself to considerable versatility in choice and modification of the control functions to be performed and in their time relations to the external circuit breaker and its controls.

The relay cycle time is determined by the choice of an appropriate time interval for each step; once this is selected the overall cycle time is determined, and the change of the particular control time does not affect the overall period. The stepping cycler is constructed of relatively simple and extremely reliable mechanical and electromechanical devices and includes a static timing circuit that employs solid state electronic control devices. Thus the device is extremely flexible and maintains its adjustments once they are set.

A rapid reset of the cycler is provided by stepping it forward to terminate the cycle at the reset point. No springs or clutches or other special mechanisms are required for this rapid reset, since the stepping device has a sufficiently rapid response time for such rapid reset, and the homing-relay control provides a simple and reliable technique for bypassing the time delay of the timing circuit.

The embodiment described above has special application as a reclosing relay for a power-line circuit breaker, and may be used for controlling circuit breakers generally. It also has other applications as a variable sequence control system in which various external time-related operations are to be sequenced in proper relation.

A preferred form of this invention has been shown and described by way of illustration; it is apparent that various modifications of the invention will occur to those skilled in the art. It is contemplated, therefore, that the claims which conclude this specification will cover all such modifications as fall within the true spirit of this invention.

What is claimed is:

1. An automatic reclosing relay system for reclosing a circuit breaker comprising: means for establishing a time-base control cycle having a certain plurality of substantially uniform time-base intervals, said time-base means including:

a stepping cycler rotatable through a cycle of steps corresponding in number to said certain plurality and having means for retaining said cycler in rotational position after each step, a plurality of cam means linked to and rotatable with said stepping cycler including a reset cam means having a certain operating position corresponding to a first one of said steps, and a closing cam means having a plurality of elements individually adjustable to different operating positions corresponding to different ones of said steps, a plurality of switches, each of said cam means being individually associated with at least one of said switches for actuation thereof, and a timing circuit having a time-delay period equal to said time-base interval and having means for supplying a stepping signal to said cycler;

and a control circuit includng means connecting said switches in a plurality of control networks for initiating operation of said timing circuit upon tripping of said breaker when said stepping cycler is in its first-step position and for producing a breaker reclosing signal after tripping of said breaker and when one of said adjustable closing cam elements is in its respective operating position.

2. An automatic reclosing relay system as recited in claim 1, wherein said control circuit includes homing relay means for rapidly and repeatedly stepping said cycler through the remainder of its cycle when the breaker remains closed, and said time-base means and control networks include means for activating said homing relay means.

3. An automatic reclosing relay system as recited in claim 2, wherein said timing circuit includes means operable at a predetermined cycler step following the supplying of a reclosing signal for activating said homing relay means.

4. An automatic reclosing relay system as recited in claim 2,
wherein said cam means includes another cam means individually adjustable to have an operating position corresponding to certain ones of said steps;
and wherein one of said networks includes one of said switches associated with and actuated by said other cam means, and means for activating said homing relay means.

5. An automatic reclosing relay system as recited in claim 2, wherein one of said networks includes one of said switches associated with and actuated by said closing cam elements, and means for activating said homing relay means.

6. An automatic reclosing relay system as recited in claim 2,
wherein said cam means includes a lockout cam means having a certain operating position;
and wherein one of said control networks includes at least one of said switches associated with and actuated by said lockout cam means, and means for blocking the supplying of stepping signals to said cycler when said lockout cam means is rotated to its operating position, and another of said control networks includes a switch of said homing relay means, and means for repeatedly stepping said cycler.

7. An automatic reclosing relay system as recited in claim 1, wherein said timing circuit means for supplying a stepping signal is operable at the end of said time-delay period.

8. An automatic reclosing relay system as recited in claim 7, wherein said control circuit further includes means for producing an immediate step of said cycler when said breaker reclosing signal is produced.

9. An automatic reclosing relay system as recited in claim 8, wherein said control circuit further includes means for blocking the supplying of a stepping signal to said cycler after said immediate cycler step.

10. An automatic reclosing relay system as recited in claim 7, wherein said control circuit further includes an auxiliary relay having a switch means for producing an immediate step of said cycler when said breaker reclosing signal is produced and for blocking the supplying of a stepping signal to said cycler after said immediate cycler step.

11. An automatic reclosing relay system as recited in claim 1,
wherein said cam means includes a lockout cam means having a certain operating position;
and wherein one of said control networks includes at least one of said switches associated with and actuated by said lockout cam means, and means initiating operation of and for maintaining the energization of said timing circuit except when said lockout cam means is rotated to its operating position.

12. An automatic reclosing relay system as recited in claim 1, wherein said control circuit further includes an auxiliary relay circuit for maintaining said breaker reclosing signal for the duration of said time-delay period.

13. An automatic reclosing relay system as recited in clam 1, wherein said cycler and said closing cam means include indexing means for positioning said closing cam means in certain step relation to said cycler.

14. An automatic reclosing relay system as recited in claim 1, wherein said timing circuit includes a static electronic control device and reactive network for producing a control signal after said time-delay period.

15. An automatic reclosing relay system as recited in claim 1,
wherein said cam means includes another cam means individually adjustable to have an operating position corresponding to certain ones of said steps,
and wherein one of said networks includes one of said switches associated with and actuated by said other cam means, and means for supplying signals to control said time-base means.

16. An automatic reclosing relay system as recited in claim 1,
wherein said cam means includes another cam means individually adjustable to have an operating position corresponding to certain ones of said steps,
and wherein one of said networks includes one of said switches associated with and actuated by said other cam means, and means for supplying signals to control the operation of said circuit breaker.

17. An automatic reclosing relay system as recited in claim 1, and further comprising switch means responsive to the stepping of said cycler for actuating said timing circuit to begin a time-delay period.

18. A sequential control relay system comprising: means for establishing a time-base control cycle having a certain plurality of substantially uniform time-base intervals, said time-base means including:
a stepping cycler rotatable through a cycle of steps corresponding in number to said certain plurality and having means for retaining said cycler in rotational position after each step,
a plurality of cam means linked to and rotatable with said stepping cycler including a reset cam means having a certain operating position corresponding to a first one of said steps, and a control cam means having a plurality of elements individually adjustable to different operating positions corresponding to different ones of said steps,
a plurality of switches, each of said cam means being individually associated with at least one of said switches for actuation thereof,
and a timing circuit having a time-delay period equal to said time-base interval and having means for supplying a stepping signal to said cycler;

and a control circuit including means for connecting said switches in a plurality of networks for producing control signals when said adjustable control cam elements are in their respective operating positions, and homing relay means for rapidly and repeatedly stepping said cycler from intermediate positions of said cycler to its reset position.

References Cited
UNITED STATES PATENTS

| | | | |
|---|---|---|---|
| 1,974,978 | 9/1934 | Anderson | 317—22 |
| 2,040,425 | 5/1936 | Biach | 317—22 |
| 2,444,210 | 6/1948 | Lauricella | 307—112 |
| 3,114,079 | 12/1963 | Sofianek et al. | 317—36 X |
| 3,182,228 | 5/1965 | Gambill et al. | 317—148.5 |

MILTON O. HIRSHFIELD, *Primary Examiner.*

J. D. TRAMMELL, *Assistant Examiner.*